(12) United States Patent
Trentel

(10) Patent No.: US 12,455,714 B2
(45) Date of Patent: Oct. 28, 2025

(54) PANORAMIC MODULAR DISPLAY SYSTEMS AND DEVICES

(71) Applicant: Maurice Matthew Trentel, Mableton, GA (US)

(72) Inventor: Maurice Matthew Trentel, Mableton, GA (US)

(*) Notice: Subject to any disclaimer, the term of this patent is extended or adjusted under 35 U.S.C. 154(b) by 0 days.

(21) Appl. No.: 18/490,338

(22) Filed: Oct. 19, 2023

(65) Prior Publication Data

US 2024/0394003 A1 Nov. 28, 2024

Related U.S. Application Data

(60) Provisional application No. 63/468,340, filed on May 23, 2023.

(51) Int. Cl.
*G06F 3/14* (2006.01)

(52) U.S. Cl.
CPC .................... *G06F 3/1446* (2013.01)

(58) Field of Classification Search
CPC ...................................... G06F 3/1446
See application file for complete search history.

(56) References Cited

U.S. PATENT DOCUMENTS

| | | | | |
|---|---|---|---|---|
| 8,539,705 B2* | 9/2013 | Bullister | ............... | G06F 1/1615 361/679.04 |
| 9,998,708 B1* | 6/2018 | Bakshi | ................. | G06F 3/1454 |
| 10,678,490 B1* | 6/2020 | Brown | ................... | G06F 3/1446 |
| 2001/0040671 A1* | 11/2001 | Metcalf | .................. | G03B 37/04 353/94 |
| 2003/0015632 A1* | 1/2003 | Dunn | ..................... | F16M 11/10 248/122.1 |
| 2009/0278826 A1* | 11/2009 | Murphy | .................... | G09F 9/33 345/204 |
| 2011/0175796 A1* | 7/2011 | Pedro | ................... | H04N 23/698 345/1.3 |
| 2012/0032929 A1* | 2/2012 | Cho | ....................... | G06F 3/1446 345/1.3 |
| 2013/0181901 A1* | 7/2013 | West | .................... | H04N 9/3147 345/1.3 |
| 2013/0328777 A1* | 12/2013 | Johnson | ............... | H04N 13/356 345/1.3 |
| 2015/0205106 A1* | 7/2015 | Norden | ................... | G06F 3/012 345/7 |
| 2018/0192042 A1* | 7/2018 | Stolzberg | ........... | H04N 21/4122 |
| 2019/0094678 A1* | 3/2019 | Ameres | ................ | H04N 9/3147 |
| 2022/0277611 A1* | 9/2022 | Winston | ............... | G07F 17/3213 |
| 2022/0323808 A1* | 10/2022 | Bradley | ................ | G09B 19/003 |
| 2023/0385010 A1* | 11/2023 | Fitzgerald | ............. | G06F 3/1423 |
| 2023/0410717 A1* | 12/2023 | Kim | ......................... | H04Q 9/00 |
| 2024/0111474 A1* | 4/2024 | Fitzgerald | ................ | G09G 5/14 |

* cited by examiner

*Primary Examiner* — Amy Onyekaba
(74) *Attorney, Agent, or Firm* — Meunier Carlin & Curfman LLC

(57) ABSTRACT

Exemplary systems and devices are disclosed that provide modular display systems with modular components (e.g., panoramic connection devices and/or modular adapters) that can be used to configure and connect multiple displays such as computing devices (e.g., laptops, edge computing devices) and/or display devices (e.g., monitors, edge display devices) to one another, for example, in a vertical or horizontal array.

9 Claims, 12 Drawing Sheets

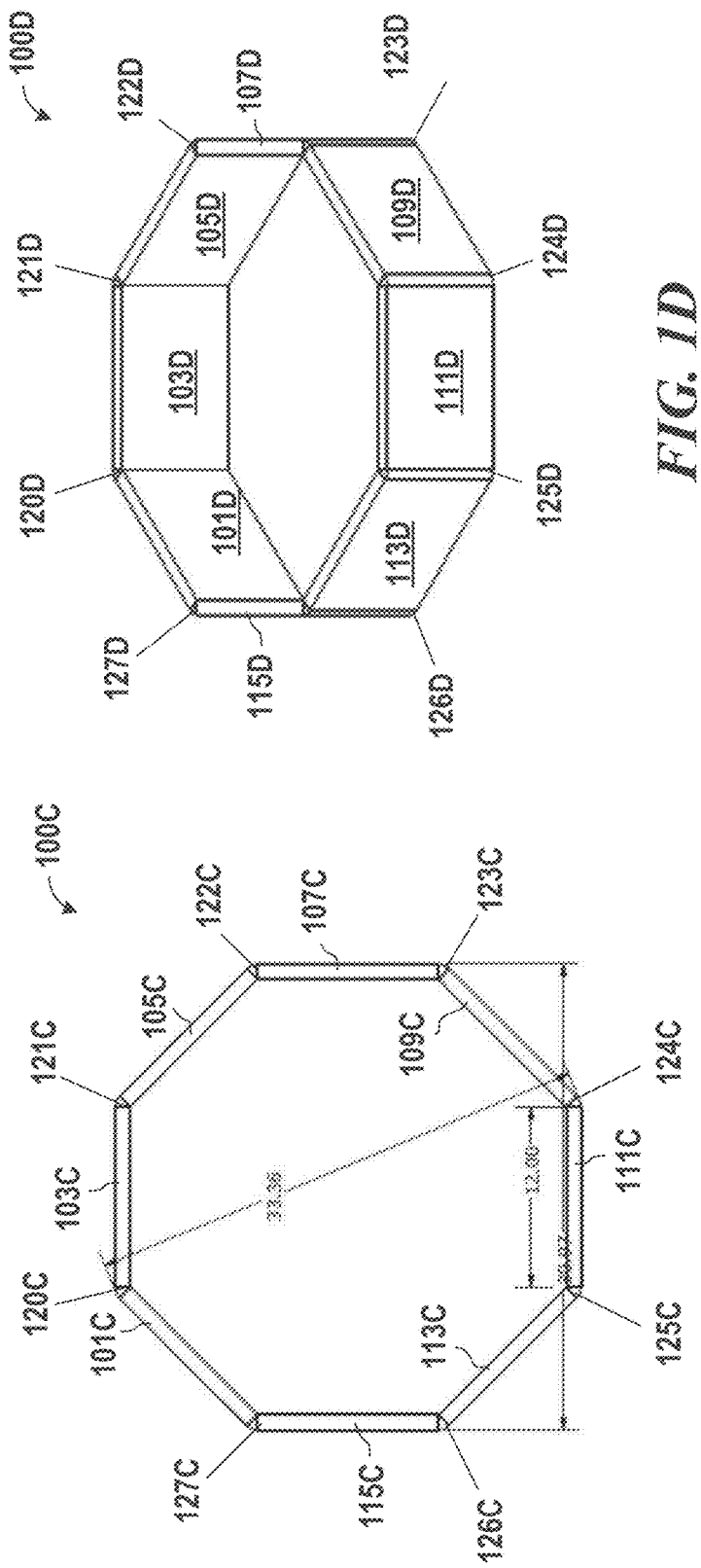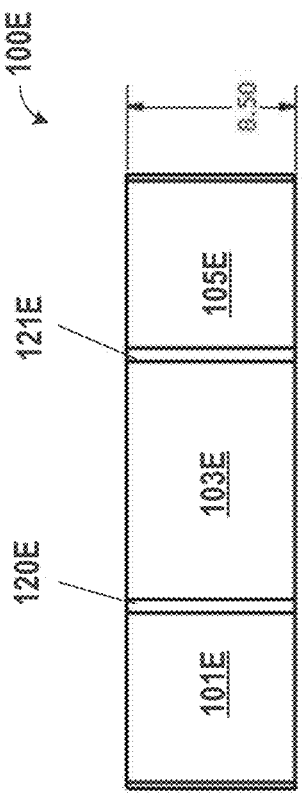

PANORAMIC MODULAR DISPLAY SYSTEMS AND DEVICES

CROSS-REFERENCE TO RELATED APPLICATIONS

This Application claims the benefit of U.S. provisional patent application No. 63/468,340, filed on May 23, 2023, and titled "PANORAMIC MODULAR DISPLAY SYSTEMS AND DEVICES," the content of which is hereby incorporated herein by reference in its entirety.

BACKGROUND

Computing devices, such as laptops, monitors, and tablets can be used to present and/or display information to an end user. Many display systems are plagued with technical challenges and limitations. For example, a user may need to connect multiple devices together using many cables/connectors in a disorganized fashion and certain devices may be unable to communicate and/or transmit information seamlessly with one another. There is a benefit to improving display systems.

SUMMARY

Exemplary systems and devices are disclosed that provide a modular panoramic display system with modular components (e.g., modular adapters and/or panoramic connection devices) that can be used to connect/combine multiple computing devices and/or display devices into an array. One of the connected devices can control and/or cause display or information/data to the devices in the array, for example, by extending a view across the array or providing multiple views, viewports, on different display screens.

Multiple and/or extended displays are used in a variety of applications and environments including entertainment systems, gaming, finance (e.g., trading floors, dealing rooms), workplaces including corporate settings (e.g., conference rooms, control rooms) and government offices (e.g., Federal Emergency Management Agency, National Aeronautics and Space Administration). However, existing display systems are inflexible and not suitable for collaborative display. By way of example, when multiple gamers in a single room play a video game, they are generally unable to simultaneously view the entirety of the gameplay area and/or each other's actions on a single screen or system. Similarly, in corporate and government settings/offices, in order for multiple people to share information on a screen in a particular room, one person must disconnect their device from the system in order for another person to start sharing information which is time consuming and inconvenient. The exemplary system is suitable for multiple people to display information simultaneously or in parallel using a single screen or display system.

In accordance with some embodiments of the present disclosure, a modular panoramic display system is provided. The system can comprise: at least one edgeless computing device comprising a first plurality of side panels, wherein at least one side panel comprises one or more first recessed (e.g., female) or extruding (e.g., male) connecting elements; and a plurality of edgeless display devices (e.g., monitors) operatively coupled to the at least one edgeless computing device via a plurality of panoramic edge connection devices (e.g., via a single connection point or multiple connection points), wherein: each of the plurality of edgeless display devices comprises a second plurality of side panels having one or more second recessed or extruding connecting elements, and each of the plurality of panoramic edge connection devices comprises at least one of a recessed edge panel or an extruding edge panel that is configured to mate with one of the first recessed or extruding connecting elements or one of the second recessed or extruding connecting elements.

In some embodiments, a first edgeless computing device and the plurality of edgeless display devices are operatively coupled to one another vertically such that a bottom surface of the first edgeless computing device is adjacent a top surface of a first edgeless display device, and a top surface of the first edgeless computing device is adjacent a bottom surface of a second edgeless display device.

In some embodiments, a first edgeless computing device and the plurality of edgeless display devices are configured to be operatively coupled to one another horizontally such that a first side surface of the of the first edgeless computing device is adjacent a first side surface of a first edgeless display device, and a second side surface of the first edgeless computing device is adjacent a first side surface of a second edgeless display device.

In some embodiments, the at least one edgeless computing device and the plurality of edgeless display devices are operatively coupled to one another to form a continuous octagonal array.

In some embodiments, the at least one edgeless computing device comprises between one and three edgeless computing devices, and wherein the plurality of edgeless display devices comprises between six to eight edgeless display devices.

In some embodiments, each of the first plurality of side panels and each of the second plurality of side panels comprises at least one of a Universal Serial Bus port (e.g., USB-A port, USB-B port, USB-C port, USB-B Mini port, USB-B Micro port, USB-3 port), Lighting port, High-Definition Multimedia Interface (HDMI) port (e.g., Type A, Type B, Type C, Type D), Ethernet port, charging port, a Micro Secure Digital (SD) port, audio/microphone port, Thunderbolt port, or Wireless Fidelity (Wi-Fi) switch.

In some embodiments, the at least one edgeless computing device comprises a first side panel with recessed connecting elements and a second side panel with recessed connecting elements.

In some embodiments, the at least one edgeless computing device further comprises: at least one processor; and at least one memory including computer program code for one or more programs (e.g., an application), and a network interface, the at least one memory and the computer program code configured to, with the at least one processor, cause the at least one edgeless computing device to: cause and/or control display of information/data to the plurality of edgeless display devices.

In some embodiments, each of the plurality of panoramic edge connection devices is configured to obtain power from the at least one edgeless computing device or one of the plurality of edgeless display devices.

In accordance with certain embodiments of the present disclosure, a panoramic edge connection device is provided. The panoramic edge connection device can comprise: an elongated member comprising a top surface, a bottom surface, a first side surface and a second side surface, wherein at least one of the first side surface or the second side surface comprises one or more recessed (e.g., female) or extruding (e.g., male) connecting elements; and a printed circuit board (PCB) component located within a housing of the panoramic edge connection device, wherein the panoramic edge connection device is configured to operatively couple a first edgeless computing device or first edgeless display device to a second edgeless computing device or second edgeless display device.

In some embodiments, the elongated member comprises a pie shaped wedge.

In some embodiments, the PCB component is a substantially rectangular element located between the top surface and bottom surface of the panoramic edge connection device along a curved internal surface of the panoramic edge connection device.

In some embodiments, the panoramic edge connection device is configured to operatively couple/connect the first edgeless computing device or first edgeless display device to the second edgeless computing device or second edgeless display device horizontally or vertically.

In some embodiments, the first side surface of the panoramic edge connection device comprises a first recessed or extruding connecting element configured to mate with a corresponding recessed or extruding connecting element of a first edgeless computing device or first edgeless display device, and the second side surface of the panoramic edge connection device comprises a second recessed or extruding connecting element configured to mate with a corresponding recessed or extruding connecting element of a second edgeless computing device or second edgeless display device.

In some embodiments, the panoramic edge connection device further comprises a retractable base extending from the bottom surface of the panoramic edge connection device.

In some embodiments, at least one of the first side surface or second side surface comprises at least one of a USB port (e.g., USB-A port, USB-B port, USB-C port, USB-B Mini port, USB-B Micro port, USB-3 port), Lighting port, HDMI port (e.g., Type A, Type B, Type C, Type D), Ethernet port, charging port, SD port, audio/microphone port, Thunderbolt port, or Wi-Fi switch.

In some embodiments, the panoramic edge connection device comprises a plastic, polymer, aluminum, or composite metal.

In some embodiments, an outer surface of the panoramic edge connection device is coated with rubber or plastic.

In some embodiments, the panoramic edge connection device is configured to obtain power from at least one of the first edgeless computing device, first edgeless display device, second edgeless computing device or second edgeless display device.

In some embodiments, the one or more recessed or extruding connecting elements are configured to be retractable and/or extendable.

In accordance with certain embodiments of the present disclosure, a modular display system is provided. The system can comprise: at least one computing device including: at least one processor; and at least one memory including computer program code for one or more programs (e.g., an application), and a network interface, the at least one memory and the computer program code configured to, with the at least one processor, cause the at least one computing device to cause and/or control display of information/data to one or more devices; a modular adapter that is removably attached to at least one surface (e.g., rear surface) of the at least one computing device, wherein: the modular adapter comprises a first end portion and a second end portion, the first end portion is configured to operatively couple the at least one computing device to a first device (e.g., another computing device or display device) via a first panoramic connection device, and the second end portion is configured to operatively couple the at least one computing device to a second device (e.g., another computing device or display device) via a second panoramic connection device.

In some embodiments, the modular adapter comprises an actuator (e.g., knob or dial) that facilitates lengthening, shortening, and/or securing the modular adapter to the at least one surface of the at least one computing device.

In some embodiments, the first end portion and the second end portion each comprise a half-shaped ellipse.

In some embodiments, each of the first end portion and second end portion comprise a spring-loaded prong that can be inserted into a corresponding aperture of the first panoramic connection device and the second panoramic connection device.

In accordance with certain embodiments of the present disclosure, a system is provided. The system can comprise: at least one computing device; and a plurality of panoramic display devices operatively coupled to one another and in wireless communication with the at least one computing device, wherein the at least one computing device is configured to cause and/or control display of information/data to the plurality of panoramic display devices simultaneously or in parallel, and wherein the at least one computing device is configured to modify groupings of the plurality of panoramic display devices in real-time.

Other aspects and features, according to the example embodiments of the disclosed technology, will become apparent to those of ordinary skill in the art upon reviewing the following detailed description in conjunction with the accompanying figures.

BRIEF DESCRIPTION OF THE DRAWINGS

The accompanying drawings, which are incorporated in and constitute a part of this specification, illustrate embodiments and together with the description, serve to explain the principles of the devices and methods.

FIG. 1C is a top view of an example modular panoramic display system in accordance with an illustrative embodiment.

FIG. 1D is a perspective view of an example modular panoramic display system in accordance with an illustrative embodiment.

FIG. 1E is a side view of a portion of the example modular panoramic display system in accordance with an illustrative embodiment.

DETAILED DESCRIPTION

Figure 1A:
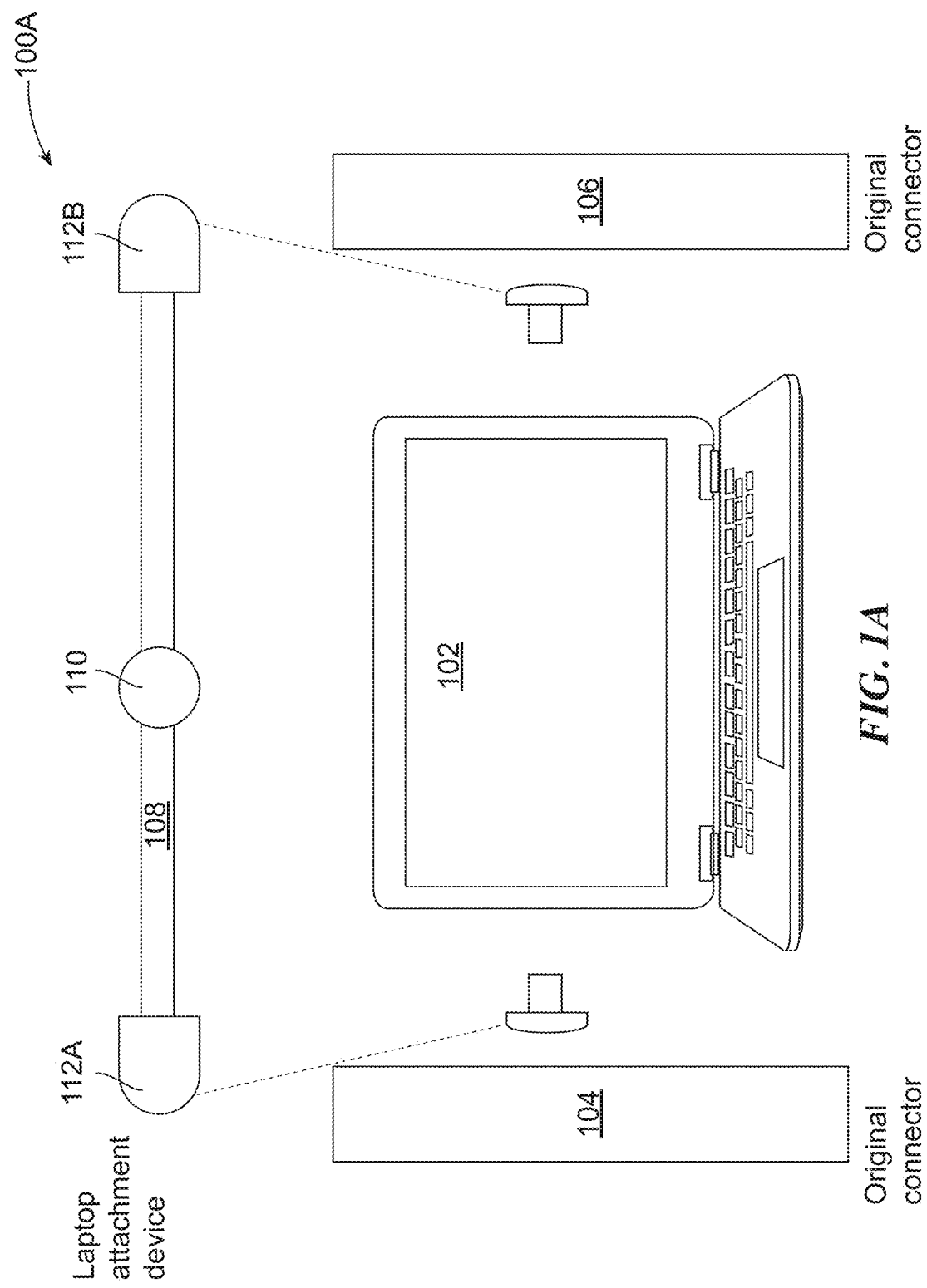
FIG. 1A depicts an exemplary modular panoramic display system in accordance with an illustrative embodiment.

Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

Exemplary systems and devices are disclosed that provide a modular panoramic display system that can be used to connect a plurality of computing devices and/or display devices. This can allow a user to quickly and easily configure or reconfigure a display of multiple computing devices and/or display devices for different purposes and settings. In one example, multiple gamers can simultaneously view a gameplay area and watch each other play. In another example, multiple individuals can each connect to at least one of a plurality of display devices simultaneously and can reconfigure the plurality of display devices without interrupting a given activity (e.g., presentation, game, or other viewing activity).

In the following description, references are made to the accompanying drawings that form a part hereof and that show, by way of illustration, specific embodiments or examples. In referring to the drawings, like numerals represent like elements throughout several figures.

Example Modular Panoramic Display System

In various examples, a primary computing device can be configured to control a plurality of independent computing devices and/or display devices, for example where each additional device is individually controlled or where each additional device is controlled as a group (e.g., an extended display). The primary computing device may be in electronic communication with the plurality of independent computing devices and/or display devices via Wi-Fi, hardware/software, a plurality of panoramic connection devices, combinations thereof, and/or the like. Each system device (primary and secondary devices) may include an application code or a package to facilitate control by a primary computing device.

FIG. 1A is a schematic diagram depicting a perspective view of the exemplary modular panoramic display system 100A in accordance with an illustrative embodiment.

The example modular panoramic display system 100A includes a computing device 102 (e.g., primary computing device), a first panoramic connection device 104, a second panoramic connection device 106, and a modular adapter 108. The computing device 102 can be a laptop, tablet, and/or the like. The computing device 102 can comprise a controller (e.g., software, hardware, combinations thereof) for controlling operations of the modular panoramic display system 100A. For example, the computing device 102 can be connected to two other computing devices, display devices, and/or the like via the first panoramic connection device 104, second panoramic connection device 106, and modular adapter 108 and control and/or cause display of data/information (e.g., image, text, video, and/or the like) to the two other computing devices. In some implementations, the computing device 102 is in electronic communication with one or more display devices via a wireless network connection (e.g., Bluetooth®, LiFi, mesh network). In some embodiments, a display of information can be extended or divided between a plurality of screens.

The modular adapter 108 is a substantially cylindrical member having a first end portion 112A and a second end portion 112B. As depicted, the modular adapter 108 is configured to be removably attached to a rear surface of the computing device 102. Additionally, the modular adapter 108 comprises an actuator 110 (e.g., knob, dial) that facilitates lengthening or shortening a length of the modular adapter 108, for example, by turning, twisting or otherwise manipulating the actuator 110. The modular adapter 108 can comprise a bendable/flexible metallic material, hinges, ratchets, clamps, and/or the like and is configured to be attached to a surface of the computing device 102. As shown, each of the first end portion 112A and the second end portion 112B comprises a half-shaped ellipse that can be operatively coupled to a respective panoramic connection device. As shown, the first end portion 112A is configured to connect to the first panoramic connection device 104 and the second end portion is configured to connect to the second panoramic connection device 106. Each of the first panoramic connection device 104 and the second panoramic connection device 106 can comprise a elongated member (e.g., pie-shaped wedge), described in more detail below. In some examples, each of the first end portion 112A and second end portion 112B comprise spring-loaded prongs that can be inserted into a corresponding aperture of the first panoramic connection device 104 and second panoramic connection device 106.

FIG. 1B, FIG. 1C, FIG. 1D, and FIG. 1E are views of an exemplary panoramic display system in accordance with certain embodiments of the present disclosure.

Figure 1B:
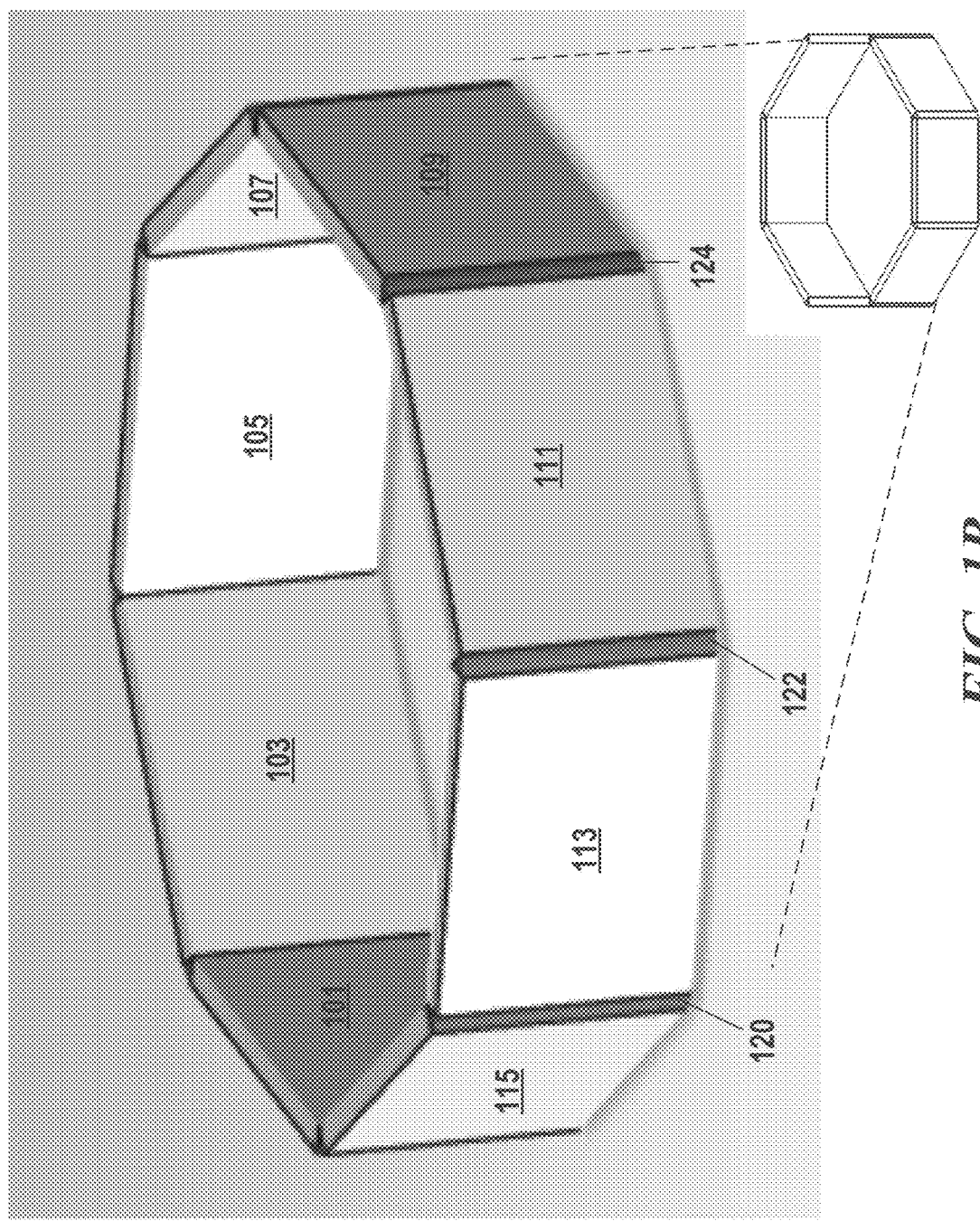
FIG. 1B illustrates a modular panoramic display system in accordance with an illustrative embodiment.

FIG. 1B illustrates another example embodiment of the example modular panoramic display system 100B. In various embodiments, the modular panoramic display system 100B includes at least one edgeless computing device 101 operatively coupled to a plurality of edgeless display devices (as shown, 103, 105, 107, 109, 111, 113, and 115) via a plurality of panoramic connection devices (as shown, 120, 122, and 124). In some examples, the modular panoramic display system 100B comprises one or two edgeless computing devices 101 and between six and eight edgeless display devices. The at least one edgeless computing device 101 can be a rectangular display that is entirely made from glass or a similar material. The at least one edgeless computing device 101 may be a lightweight electronic device with minimal storage capacity and processing power. The at least one edgeless computing device 101 can be a laptop, tablet, television, desktop, gaming console, Single-Board Computer (SBC), thin client, workstation, electronic reader, touchscreen device, combinations thereof, and/or the like. In some embodiments, the plurality of edgeless display devices can be or comprise a liquid crystal display (LCD) monitor, a light emitting diode (LED) monitor, an organic light emitting diode (OLED) monitor, a curved monitor, a bendable monitor, a touchscreen monitor, a gaming monitor, a 4K monitor, an 8K monitor, a portable monitor, a medical monitor, a large format display monitor, and/or the like. In some implementations, the modular panoramic display system 100B consists only of various display devices and is in wireless communication with one or more other computing devices (e.g., laptops, input devices, gaming consoles, or the like).

In the example shown in FIG. 1B, the plurality of devices is coupled to one another horizontally or side-by-side to form an array. As depicted, a first horizontal side of a first edgeless computing device 101 is removably attached/connected to a first edgeless display device 103 and a second horizontal side of the at least one edgeless computing device 101 is removably attached/connected to a second panoramic display device 115. The remainder of the plurality of display devices are connected in sequence to form a continuous octagonal array. For example, a third panoramic display device 113 is connected to the second panoramic display device 115 via a first panoramic connection device 120, a fourth panoramic display device 111 is connected to the third panoramic display device 113 via a second panoramic connection device 122, and a fifth panoramic display device 109 is connected to the fourth panoramic display device 111 via a third panoramic connection device 124.

Referring now to FIG. 1C, a top view of an example modular panoramic display system is provided.

As illustrated, the modular panoramic display system 100C includes at least a first edgeless computing device 101C that is connected in sequence with a plurality of panoramic display devices 103C, 105C, 107C, 109C, 111C, 113C, 115C to form a continuous octagonal array. As further depicted, the devices are connected to one another via a plurality of panoramic connection devices 120C, 121C, 122C, 123C, 124C, 125C, 126C, and 127C. In other words, each panoramic connection device is positioned (e.g., disposed, located) between two different devices, such as a display device and a computing device (e.g., a first panoramic connection device 120C is positioned between the first edgeless computing device 101C and a first display device 103C) or two different display devices (e.g., a second panoramic connection device 121C is positioned between the first display device 103C and a second display device 105C).

Referring now to FIG. 1D, a perspective view of an example modular panoramic display system 100D is provided.

As shown, the modular panoramic display system 100D includes at least a first edgeless computing device 101D that is connected in sequence with a plurality of panoramic display devices 103D, 105D, 107D, 109D, 111D, 113D, 115D to form a continuous octagonal array. As further depicted, the devices are connected to one another via a plurality of panoramic connection devices 120D, 121D, 122D, 123D, 124D, 125D, 126D, and 127D. In the example shown in FIG. 1D, a first panoramic connection device 120D is positioned between the first edgeless computing device 101D and a first display device 103D and a second panoramic connection device 121D is positioned between the first display device 103D and a second display device 105D.

Referring now to FIG. 1E, a side view of a portion of the example modular panoramic display system 100E is provided.

As shown, the modular panoramic display system 100E comprises an edgeless computing device 101E operatively coupled to a first panoramic display device 103E via a first panoramic connection device 120E. Additionally, the modular panoramic display system 100E comprises a second panoramic display device 105E operatively coupled to the first panoramic display device 103E via a second panoramic connection device 121E.

While FIG. 1A, FIG. 1B, FIG. 1C, FIG. 1D, and FIG. 1E provide exemplary views of modular panoramic display systems, it is noted that the scope of the present disclosure is not limited to the examples shown in FIG. 1A, FIG. 1B, FIG. 1C, FIG. 1D, and FIG. 1E. In some examples, an example modular panoramic display system may comprise one or more additional and/or alternative elements, and/or may be structured/positioned differently than those illustrated in FIG. 1A, FIG. 1B, FIG. 1C, FIG. 1D, and FIG. 1E.

Example Edgeless Display Device

FIG. 2A, FIG. 2B, FIG. 2C, FIG. 2D, and FIG. 2E are views of an exemplary panoramic edge display device in accordance with certain embodiments of the present disclosure.

Figure 2B:
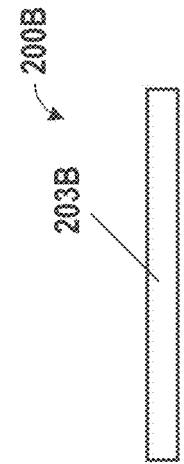
FIG. 2B is a top view of an example panoramic edge display device in accordance with an illustrative embodiment.
Figure 2C:
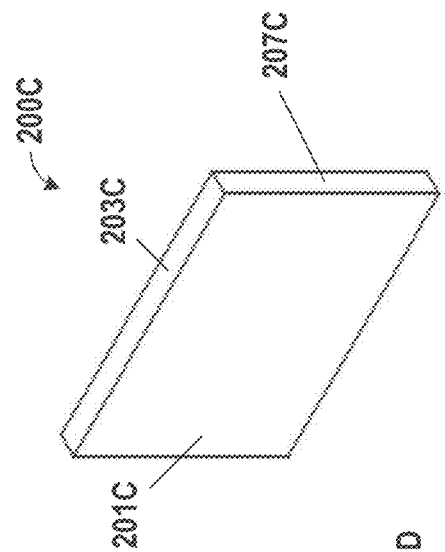
FIG. 2C is a perspective view of an example panoramic edge display device in accordance with an illustrative embodiment.
Figure 2D:
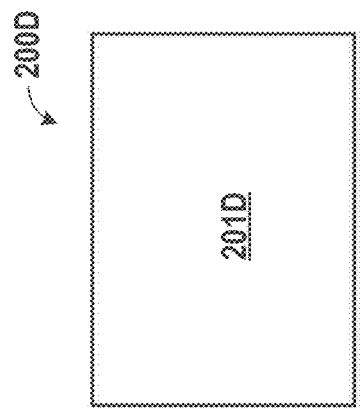
FIG. 2D is a front view of an example panoramic edge display device in accordance with an illustrative embodiment.
Figure 2A:
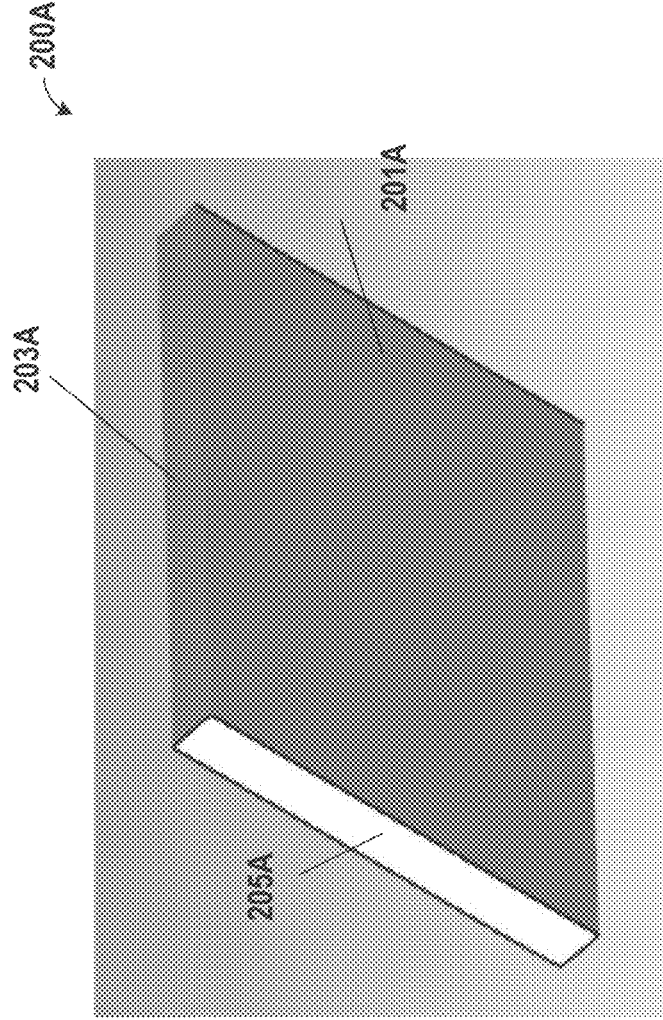
FIG. 2A is a perspective view of an example panoramic edge display device in accordance with an illustrative embodiment.

Referring now to FIG. 2A, a perspective view of an example panoramic edge display device 200A is provided. In the example shown in FIG. 2A, the panoramic edge display device 200A comprises a rectangular, planar body having a plurality of surfaces. At least one surface (e.g., side panel) of the panoramic edge display device 200A can include a side panel having recessed and/or extruding connecting elements (e.g., a recessed edge panel or extruding edge panel) that can be used to connect the panoramic edge display device 200A to another device (e.g., a panoramic edge connection device). By way of example, a recessed edge panel of a first device can be configured to mate with an extruding edge panel of a second device. In other implementations, the 200A can comprise one or more curved or bendable surfaces and/or screens.

As shown, the panoramic edge display device 200A includes at least a rear surface 201A, a top surface 203A, and a first side surface 205A. At least one surface (e.g., front surface) of the panoramic edge display device 200A can comprise a screen. The panoramic edge display device 200A can comprise a computing device, such as the computing device 500 discussed below in connection with FIG. 5.

With reference to FIG. 2B, a top view of an example panoramic edge display device 200B depicting a top rectangular surface 203B is provided.

Referring now to FIG. 2C, another perspective view of an example panoramic edge display device 200C is provided. As shown, the panoramic edge display device 200C is a rectangular, planar body having at least a front surface 201C (e.g., screen), a top surface 203C, and a side surface/panel 207C.

Referring now to FIG. 2D, a front view of an example panoramic edge display device 200D is provided. As illustrated, the 200D includes a front surface 201D which can comprise an edgeless screen.

Example Panoramic Edge Connection Device

Figure 2E:
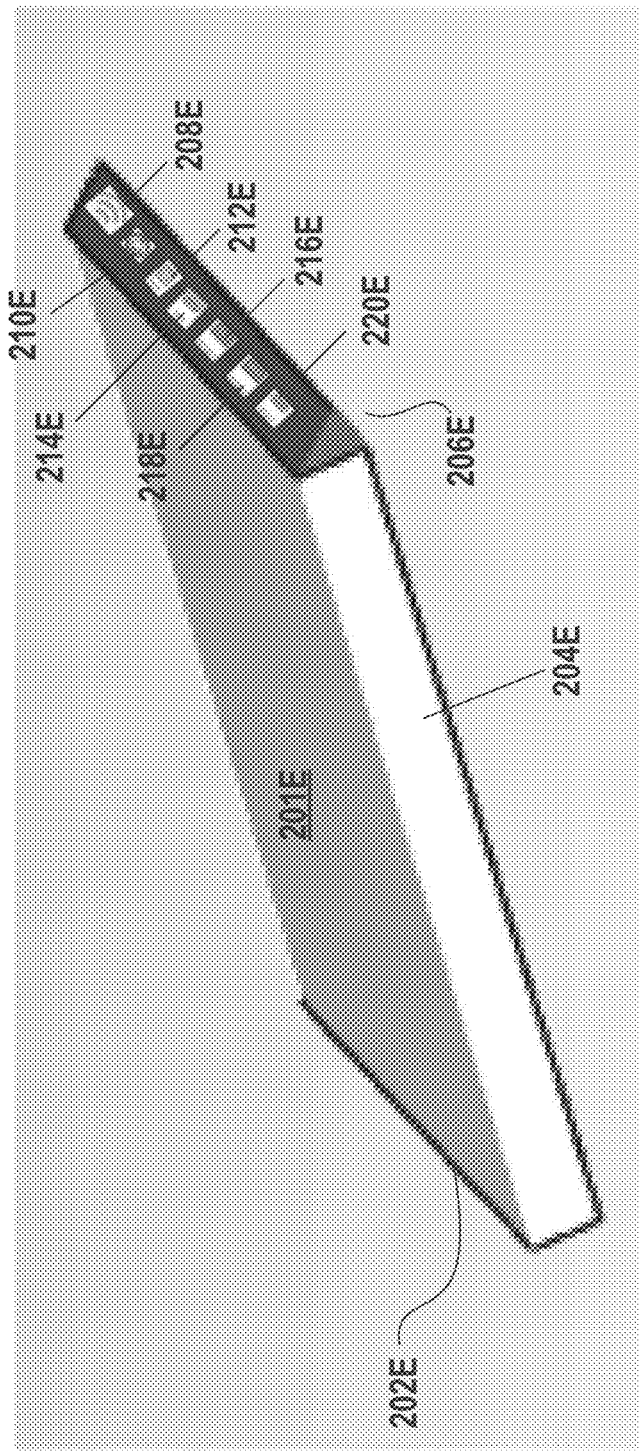
FIG. 2E is a perspective view of an example panoramic edge display device in accordance with an illustrative embodiment.

Turning to FIG. 2E, a side perspective view of an example panoramic edge display device 200E is provided. As shown, the panoramic edge display device 200E comprises a plurality of surfaces including a front surface 201E (e.g., screen), a first lateral side surface 202E, and a second side surface 204E. The first lateral side surface 202E is connected to a panoramic edge connection device 206E that is configured to operatively coupled the panoramic edge display device 200E to another device (e.g., a second panoramic edge display device).

The panoramic edge connection device 206E comprises a pie-shaped wedge/elongated member configured to attach to a side surface/panel of the panoramic edge display device 200E. The panoramic edge connection device 206E can be at least partially extended or lengthened in a vertical direction in order to fit dimensions of more than one type of computing or display device. The panoramic edge connection device 206E can comprise a variety of suitable materials including plastic, a polymer, aluminum, a composite metal, combinations thereof, and/or the like. In some examples, an outer surface of the panoramic edge connection device 206E can be coated with rubber or plastic. Optionally, the panoramic edge connection device 206E can include a computing device (e.g., the computing device 500 illustrated in FIG. 5). In some implementations, the panoramic edge connection device 206E can comprise a printed circuit board (PCB) component (e.g., an elongated PCB positioned along an internal back/curved surface of the panoramic edge connection device 206E) located within a housing/body of the panoramic edge connection device 206E. As shown, the panoramic edge connection device 206E comprises a first side surface (e.g., side panel) disposed adjacent a side surface/panel of the panoramic edge display device 200E and a second side surface (e.g., side panel) opposite the first side surface. As shown, the second side surface of the panoramic edge connection device 206E comprises a plurality of connecting elements 208E, 210E, 212E, 214E, 216E, 218E, and 220E. In various embodiments, the plurality of connecting elements 208E, 210E, 212E, 214E, 216E, 218E, and 220E can be recessed or extruding connecting elements that are configured to mate with a corresponding recessed/extruding connecting element of another device (e.g., edgeless computing device or edgeless display device). The plurality of connecting elements 208E, 210E, 212E, 214E, 216E, 218E, and 220E can be retractable and/or extendable such that a user can switch between a recessed configuration and an extruding configuration as needed. In some implementations, the plurality of connecting elements 208E, 210E, 212E, 214E, 216E, 218E, and 220E can include one or more of a USB port (e.g., USB-A port, USB-B port, USB-C port, USB-B Mini port, USB-B Micro port, USB-3 port), Lighting port, HDMI port (e.g., Type A, Type B, Type C, Type D), Ethernet port, charging port, SD port, audio/microphone port, Thunderbolt port, or Wi-Fi switch. Additionally, the panoramic edge connection device 206E can include any type of sensor, input device, and/or output device. Non-limiting examples can include a wireless communication module (e.g., Bluetooth®, Wi-Fi, and cellular devices), cameras, speakers (e.g., earbuds), microphones, displays, lights (e.g., flashlights, Light Emitting Diodes (LEDs), and/or LED flashlights). The panoramic edge display device 200E and the panoramic edge connection device 206E can be connected to one another electronically over a Network (e.g., the Internet), via a Bluetooth® connection, or the like.

Figure 2G:
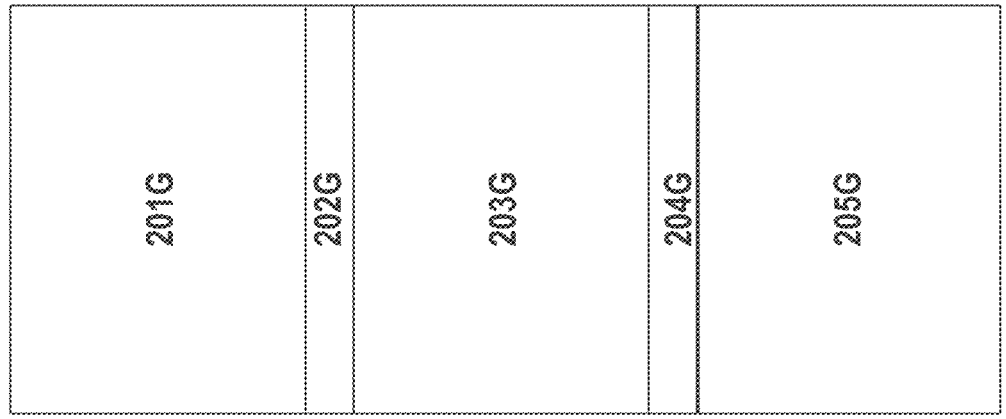
FIG. 2G is a side view of a vertical array of panoramic edge computing and/or display devices in accordance with an illustrative embodiment.
Figure 2F:
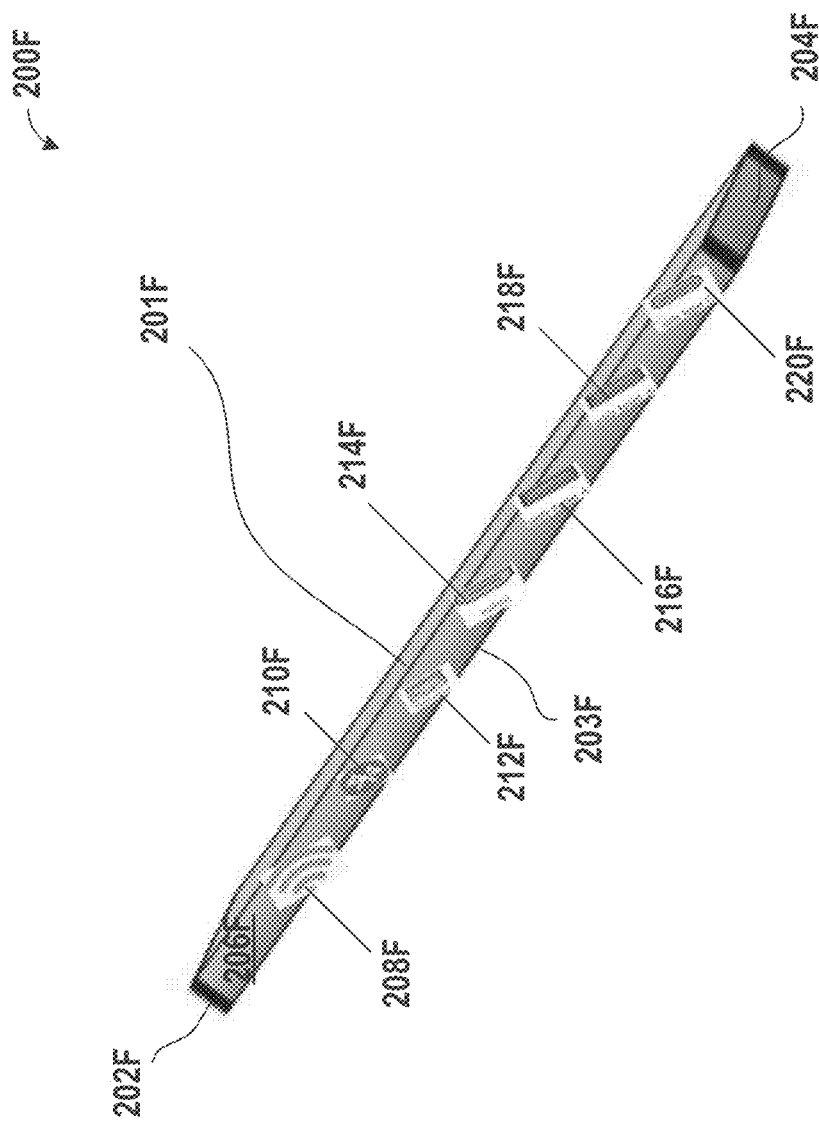
FIG. 2F is a perspective view of an example panoramic edge display device in accordance with an illustrative embodiment.

Referring now to FIG. 2F, a perspective view of an example panoramic edge display device 200F is provided. As shown, the panoramic edge display device 200F is a rectangular, planar body including at least a top surface 201F (e.g., screen), a bottom surface 203F, a first vertical side surface 202F, a second vertical side surface 204F, and a first horizontal side surface 206F. As shown, the first horizontal side surface of the panoramic edge connection display device 200F comprises a plurality of connecting elements 208F, 210F, 212F, 214F, 216F, 218F, and 220F. In various embodiments, the plurality of connecting elements 208F, 210F, 212F, 214F, 216F, 218F, and 220F can be recessed or extruding connecting elements that are configured to mate with a corresponding recessed/extruding connecting element of another device (e.g., edgeless computing device or edgeless display device via a panoramic edge connection device). The plurality of connecting elements 208F, 210F, 212F, 214F, 216F, 218F, and 220F can be similar or identical to the plurality of connecting elements 208E, 210E, 212E, 214E, 216E, 218E, and 220E discussed above in connection with FIG. 2E.

Exemplary Vertical System Configuration

In some implementations, a plurality of panoramic edge display devices and/or panoramic edge computing devices can be operatively coupled to one another vertically such that a bottom surface of a first device is adjacent a bottom surface of a second device. In other examples, a plurality of panoramic edge display devices can be operatively coupled to one another horizontally such that a first side surface of a first device is adjacent a first side surface of a second device.

With reference now to FIG. 2G, a schematic diagram depicting a side view of an array of panoramic edge computing and/or display devices 200G is provided. As illustrated, a bottom surface of a first device 201G (e.g., panoramic edge computing device or panoramic edge display device) is operatively coupled to a second device 203G (e.g., panoramic edge display device) via a first panoramic edge connection device 202G. Additionally, the second device 203G is operatively coupled to a third device 205G via a second panoramic edge connection device 204G. In various implementations, multiple computing and/or display devices can be configured horizontally or vertically to suit various applications.

Exemplary Panoramic Edge Connection Devices

Figure 3A:
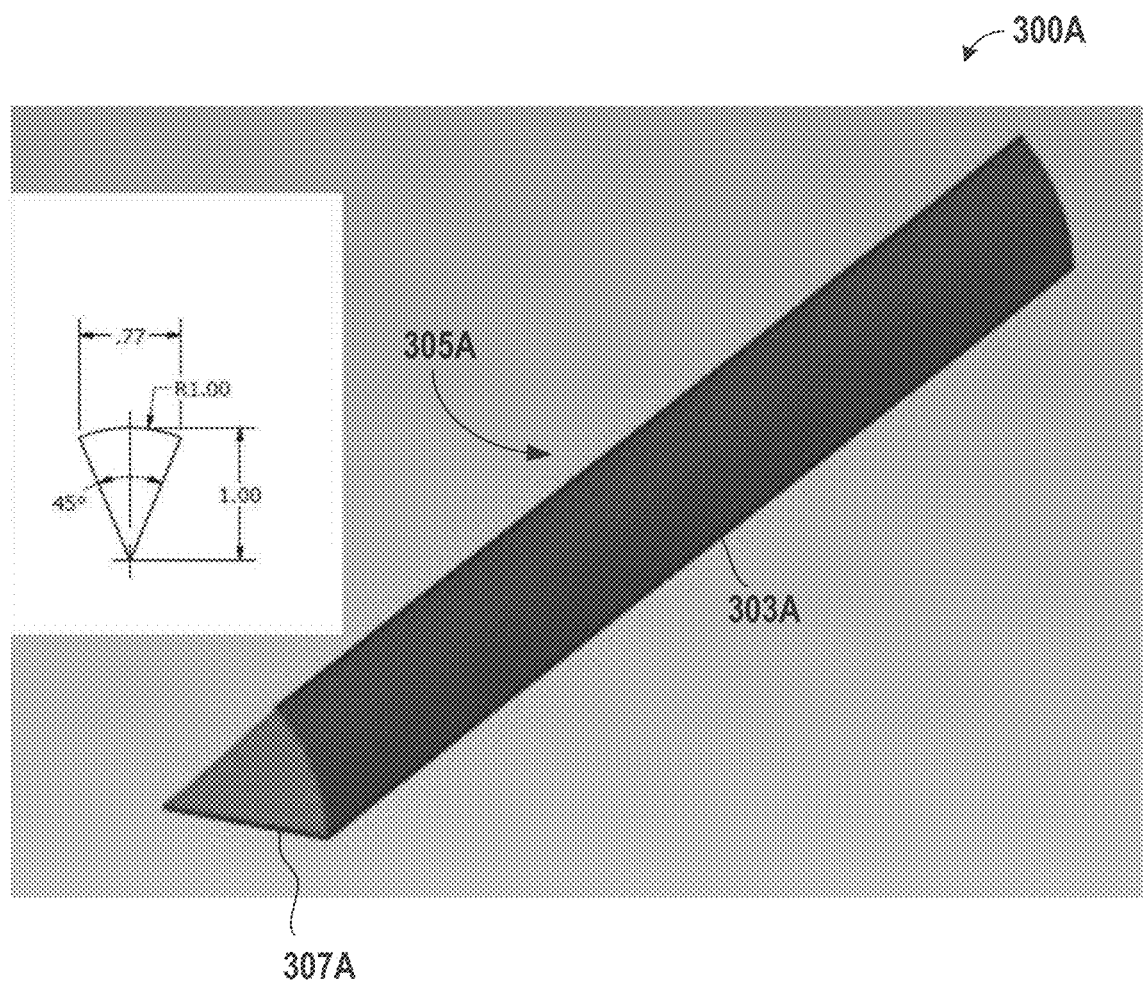
FIG. 3A is a perspective view of a panoramic edge connection device in accordance with an illustrative embodiment.
Figure 3B:
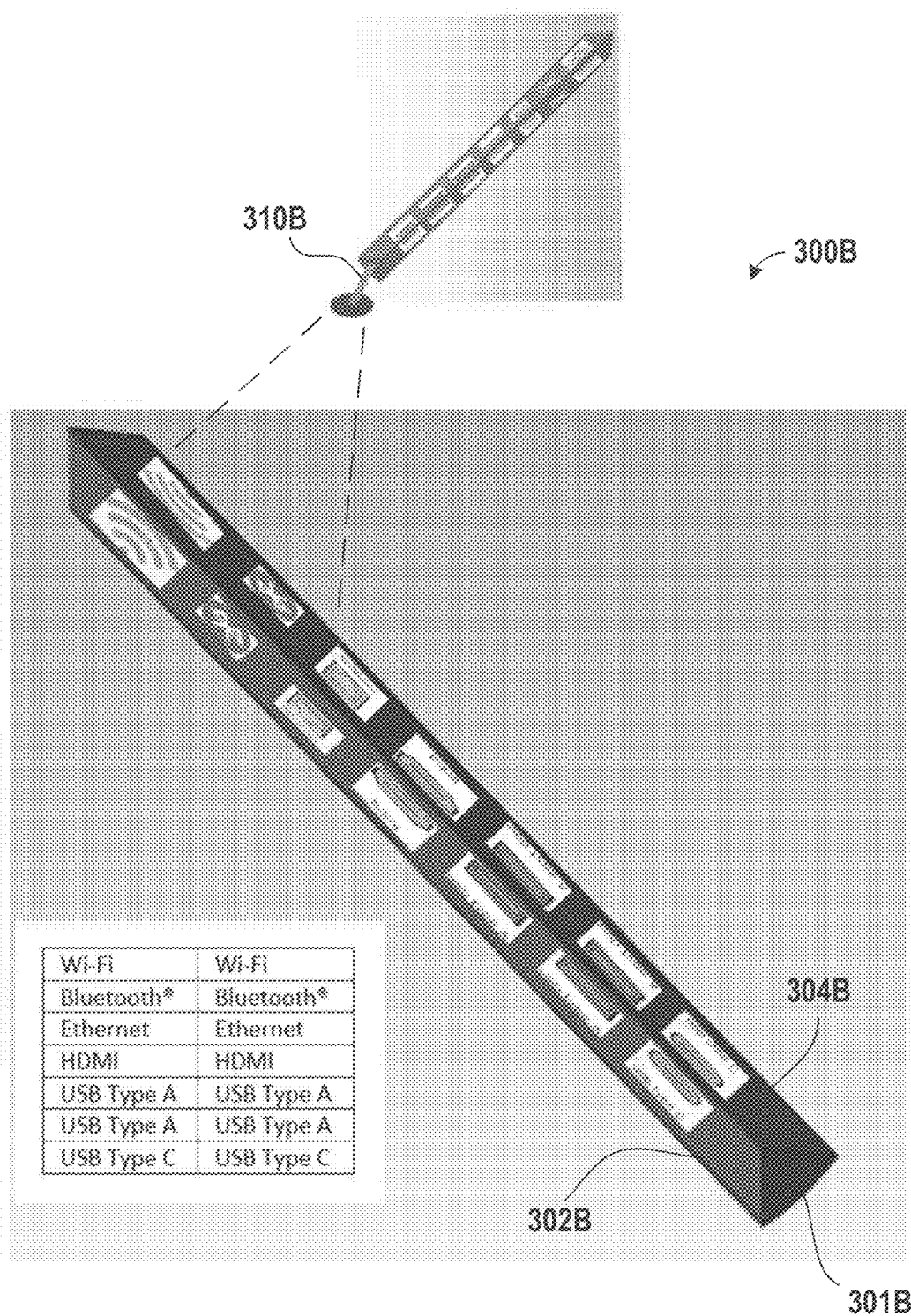
FIG. 3B is another perspective view of a panoramic edge connection device in accordance with an illustrative embodiment.
Figure 3C:
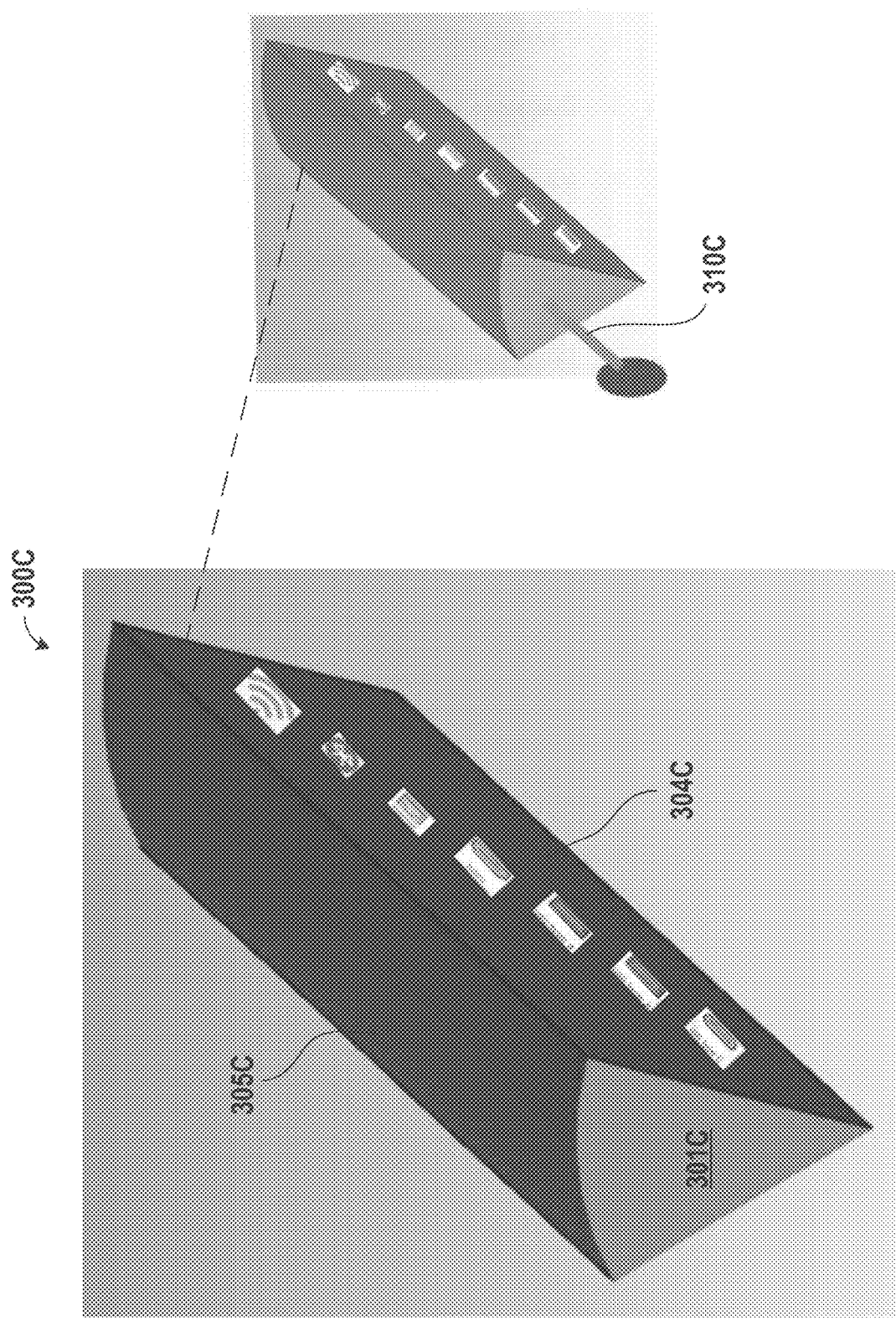
FIG. 3C is another perspective view of a panoramic edge connection device in accordance with an illustrative embodiment.

FIG. 3A, FIG. 3B, and FIG. 3C are views of an exemplary panoramic edge connection device in accordance with certain embodiments of the present disclosure. In various implementations, the panoramic edge connection device can be used to operatively connect a plurality of computing and/or display devices into an array such that at least one computing device controls, for example, by causing display/presentation of information to each of the devices in a given array. In some examples, a view (e.g., one or more images) can be extended or divided between a plurality of devices. In other words, the same data can be simultaneously presented via multiple device screens or different data (e.g., image, video, text, or the like) can be presented in parallel via multiple device screens. In some embodiments, the panoramic edge connection device can obtain power from one or more connected devices.

Referring now to FIG. 3A, a schematic diagram depicting a perspective view of a panoramic edge connection device 300A in accordance with certain embodiments of the present disclosure is provided. As shown, the panoramic edge connection device 300A comprises a pie-shaped wedge/elongated member (e.g., as shown a 45 degree pie-shaped wedge) configured to attach to at least one of a computing device and/or display device. As shown the panoramic edge connection device 300A comprises a curved back surface 303A, a first side surface 305A, and a second side surface 307A. Each of the first side surface 305A and the second side surface 307A is configured to connect to a respective device via one or more connecting elements. In some embodiments, a length of the panoramic edge connection device 300A can be at least partially extendible or retractable to different device dimensions. The panoramic edge connection device 300A can be or comprise plastic, a polymer, aluminum, a composite metal, combinations thereof, and/or the like. In some examples, an outer surface of the panoramic edge connection device 300A can be coated with rubber or plastic. The panoramic edge connection device 300A can include a computing device (e.g., the computing device 500 illustrated in FIG. 5) disposed within a body/housing of the panoramic edge connection device 300A. The computing device can be a PCB component. (e.g., an elongated PCB positioned along an internal curved back surface 303A of the panoramic edge connection device 206E) located within a housing/body of the panoramic edge connection device 300A.

Referring now to FIG. 3B, a schematic diagram depicting another perspective view of a panoramic edge connection device 300B is provided. The panoramic edge connection device 300B is an elongated member (e.g., pie-shaped wedge) having a first side surface 302B, a second side surface 304B, a triangular bottom surface 301B, and a back curved surface. As discussed herein, each of the first side surface 302B and the second side surface 304B comprises a plurality of connecting elements, including at least one connection point for interfacing with a computing device or display device. The plurality of connecting elements can include USB port(s), Lighting port(s), HDMI port(s), Ethernet port(s), charging port(s), SD port(s), audio/microphone port(s), Thunderbolt port(s), switches, and/or the like. In some embodiments, at least one of the plurality of connecting elements is a male, female, or dual (e.g., changeable) connector that is configured to interface with a computing device or display device. An exemplary table of connecting elements for the first side surface 302B and the second side surface 304B is depicted in FIG. 3B.

Additionally, in some implementations, the panoramic edge connection device 300B includes a retractable base 310B extending from a bottom surface of the panoramic edge connection device 300B. The retractable base 310B can be configured to provide power and/or support for positioning the panoramic edge connection device 300B in a horizontal array, such as the octagonal array described herein in reference to FIG. 1B.

Referring now to FIG. 3C, a schematic diagram depicting another perspective view of a panoramic edge connection device 300C is provided. The panoramic edge connection device 300C is a pie-shaped wedge including at least a first side surface 304C, a back curved surface 305C, and a triangular bottom surface 301C. In some implementations, a retractable base 310C extends from the bottom surface 301C of the panoramic edge connection device 300C that can be used to provide power and/or support in various applications.

Example Methods of Operation

FIG. 4A, FIG. 4B, FIG. 4C, FIG. 4D, and FIG. 4E are schematic diagrams showing different configurations/methods of operation for systems in accordance with illustrative embodiments. As noted above, in some implementations, modular panoramic display systems (e.g., modular panoramic display system 100B discussed above in connection with FIG. 1B) consist of only display devices (e.g., modular and/or edgeless display devices). in wireless communication with one or more computing devices. Each of the systems illustrated in FIG. 4A, FIG. 4B, FIG. 4C, FIG. 4D, and FIG. 4E can be used in a variety of applications including, but not limited to, entertainment systems, gaming, finance (e.g., trading floors, dealing rooms), workplaces/corporate settings (e.g., conference rooms, control rooms), and government offices (e.g., Federal Emergency Management Agency, National Aeronautics and Space Administration, or the like).

Figure 4A:
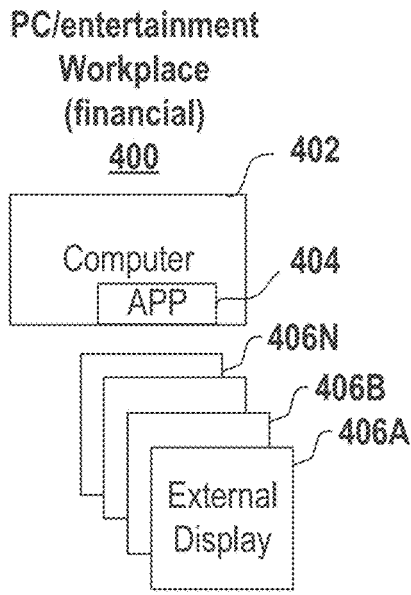
FIG. 4A, FIG. 4B, FIG. 4C, FIG. 4D, and FIG. 4E are schematic diagrams showing different configurations/methods of operation for systems in accordance with illustrative embodiments.

FIG. 4A shows an example system 400 comprising a computing device 402 in wireless communication with a plurality of external display devices 406A-N (i.e., panoramic and/or edgeless display devices) that are in turn in electronic communication with one another. As shown, an application 404 (App) executing on the computing device 402 allows the computing device 402 to communicate with (e.g., control) each of the plurality of external display devices 406A-N. For example, the application 404 may be or comprise a computer program product may include non-transitory computer-readable storage medium storing applications, programs, program modules, scripts, source code, program code, object code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media). It should be understood that each external display device 406A-N can include a similar or identical application 404 to facilitate control by the computing device 402.

Figure 4B:
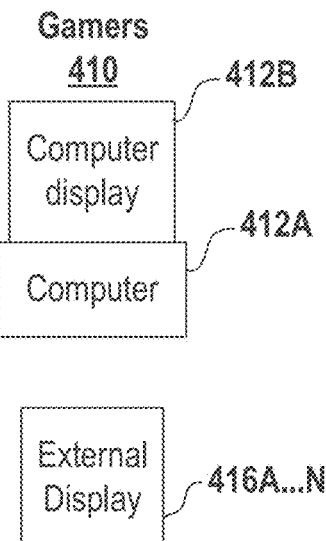

FIG. 4B shows another example system 410 that can be used for gaming. The system 410 comprises a computing device 412A having a computer display 412B in wireless communication with one or more external display devices 416A-N (e.g., panoramic and/or edgeless display devices). In some examples, the external display devices 416A-N are in electronic communication with one another (e.g., connected to one another via one or more panoramic edge connection devices). In some implementations, the computing device 412A is configured to present information simultaneously or in parallel via the computer display 412B and the one or more external display devices 416A-N.

Figure 4C:
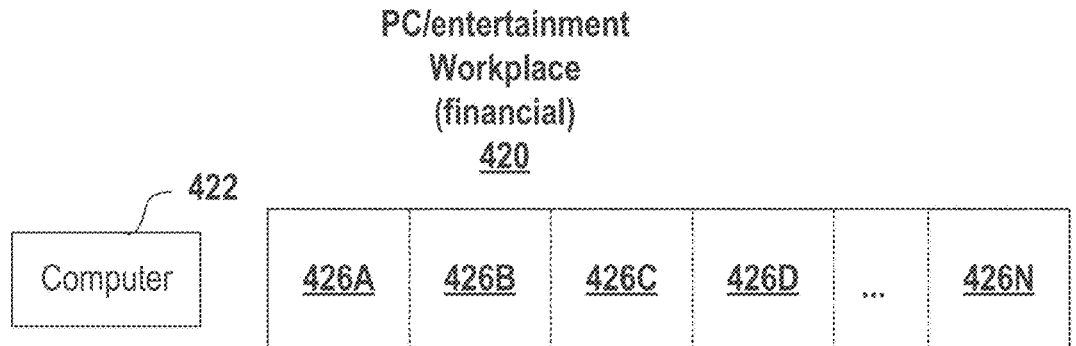

FIG. 4C shows another example system 420 comprising a computing device 422 in wireless communication with a plurality of external display devices 426A-N. In some implementations, the plurality of external display devices 426A-N can be divided into two or more sets/groupings. For example, the computing device 422 can display information to a first set or grouping of the plurality of external display devices 426A-N (e.g., external display devices 426A, 426B, 426C) and display different information to a second set or grouping of the plurality of external display devices 426A-N (e.g., external display devices 426D, 426E).

Figure 4D:
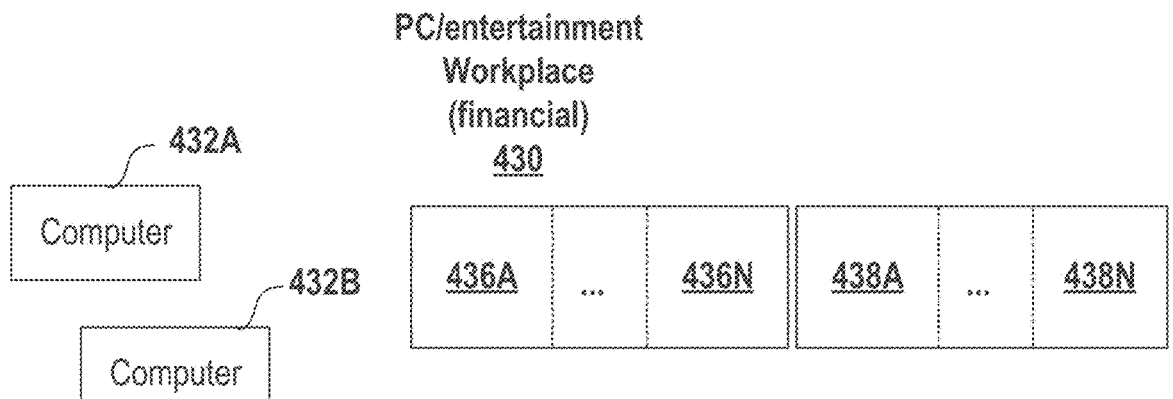

FIG. 4D shows yet another example system 430 comprising a first computing device 432A and a second computing device 432B, a first plurality of external display devices 436A-N, and a second plurality of external display devices 438A-N.

As shown, the first computing device 432A is in wireless communication with a first plurality of external display devices 436A-N such that it is configured to output data/information (e.g., video) to the first plurality of external display devices 436A-N simultaneously or in parallel. For example, in some embodiments, a first video is displayed on a first external display device 436A, a second video or other information (e.g., graph, chart, spreadsheet) is displayed on a second external display device 436B, and a third video or other information is displayed on a third external display device 436C. In another example, the same video can be shown simultaneously or shared/split between the first plurality of external display devices 436A-N.

As further depicted, the second computing device 432B is in wireless communication with the second plurality of external display devices 438A-N. It should be understood that the first plurality of external display devices 436A-N and the second plurality of external display devices 438A-N are in communication with one another so that the configuration of external display devices can be modified in real-time (i.e., while the system is in use or active display mode). For example, the first computing device 432A can transmit a control indication to the second computing device 432B and/or one or more of the external display devices (e.g., a primary external display device) to change the number of devices that, in combination, make up the first plurality of external display devices 436A-N and/or the second plurality of external display devices 436A-N (e.g., from a first set of three devices and a second set of three devices to a first set of two devices and a second set of four devices).

Figure 4E:
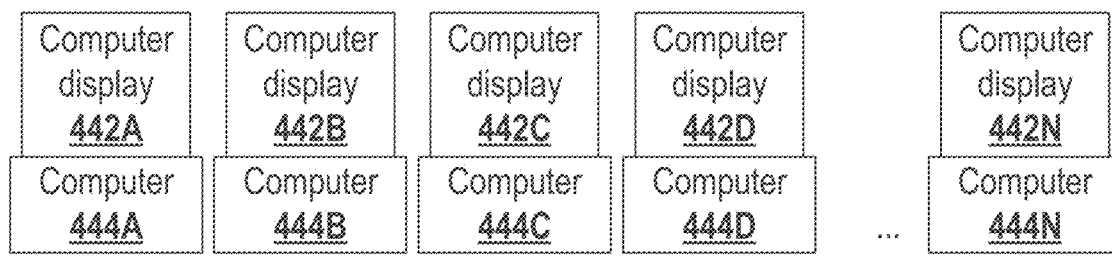

FIG. 4E is an example system 440 comprising a plurality of computing devices 444A-N that each comprises or is operatively coupled to a respective computer display 442A-N. As depicted, the plurality of computing devices 444A-N is in wireless communication with a plurality of external display devices 446A-N. Similar to the system 430 described in connection to FIG. 4D, each of the plurality of computing devices 444A-N can be configured to display information to its respective computer display 442A-N and at least one of the plurality of external display devices 446A-N simultaneously or in parallel. The associations and combinations between the plurality of computing devices 444A-N and the plurality of external display devices 446A-N can be modified in real-time. For example, a first computing device 444A can initially display information on a first external display device 446A and can be reconfigured using an App executing thereon to subsequently display information (e.g., the same information simultaneously or different information in parallel) to the first external display device 446A and a second external display device 446B.

Example Computing Device

Figure 5:
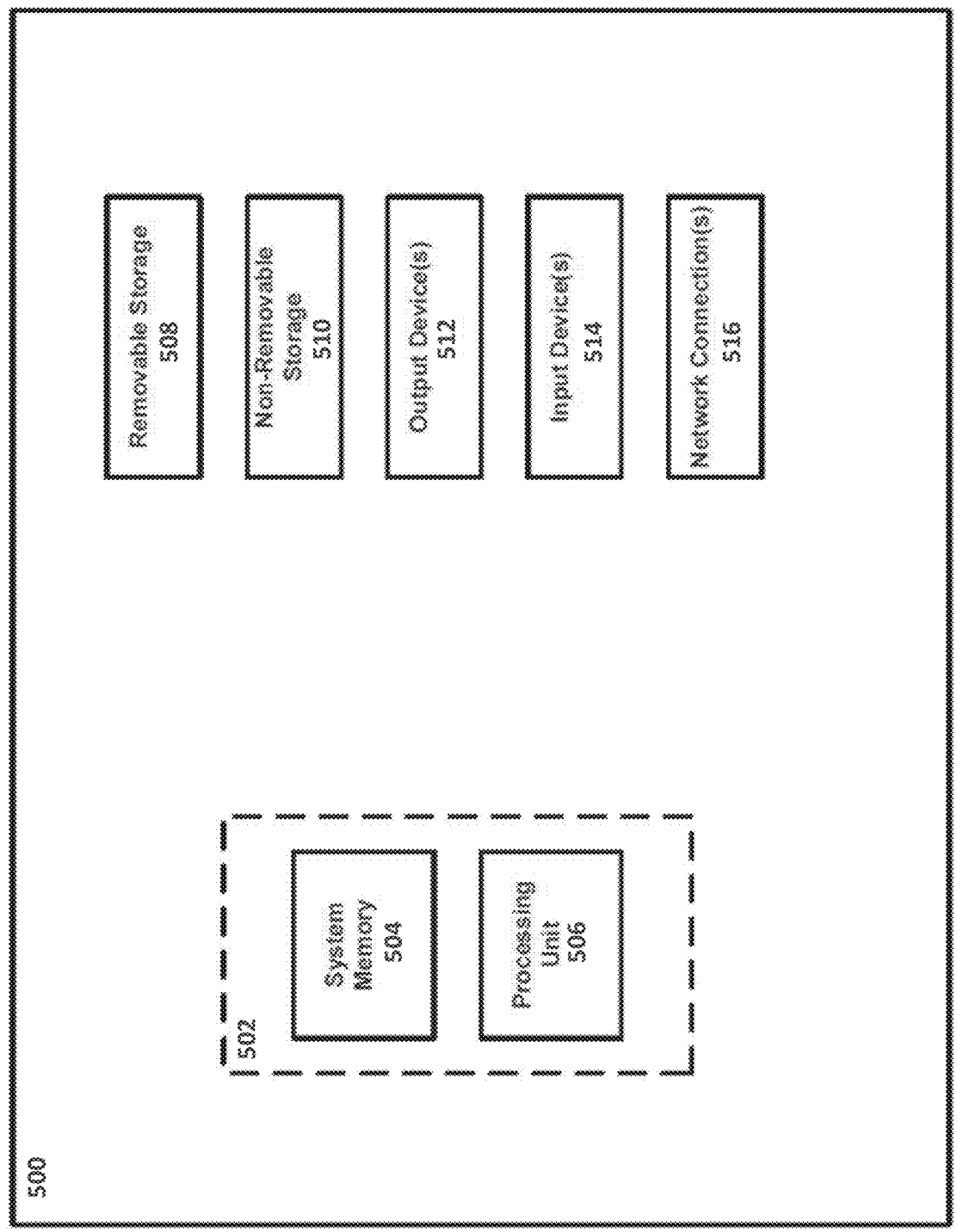
FIG. 5 is an example computing device in accordance with an illustrative embodiment.

Referring to FIG. 5, an example computing device 500 upon which the methods described herein may be implemented is illustrated. It should be understood that the example computing device 500 is only one example of a suitable computing environment upon which the methods described herein may be implemented. Optionally, the computing device 500 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 500 typically includes at least one processing unit 506 and system memory 504. Depending on the exact configuration and type of computing device, system memory 504 may be volatile (such as random access memory (RAM)), non-volatile (such as read-only memory (ROM), flash memory, etc.), or some combination of the two. This most basic configuration is illustrated in FIG. 5 by dashed line 502. The processing unit 506 may be a standard programmable processor that performs arithmetic and logic operations necessary for operation of the computing device 500. The computing device 500 may also include a bus or other communication mechanism for communicating information among various components of the computing device 500.

Computing device 500 may have additional features/functionality. For example, computing device 500 may include additional storage such as removable storage 508 and non-removable storage 510, including, but not limited to, magnetic or optical disks or tapes. Computing device 500 may also contain network connection(s) 516 that allow the device to communicate with other devices. Computing device 500 may also have input device(s) 514, such as a keyboard, mouse, touch screen, etc. Output device(s) 512, such as a display, speakers, printer, etc., may also be included. The additional devices may be connected to the bus in order to facilitate the communication of data among the components of the computing device 500. All these devices are well-known in the art and need not be discussed at length here.

The processing unit 506 may be configured to execute program code encoded in tangible, computer-readable media. Tangible, computer-readable media refers to any media that is capable of providing data that causes the computing device 500 (i.e., a machine) to operate in a particular fashion. Various computer-readable media may be utilized to provide instructions to the processing unit 506 for execution. Example of tangible, computer-readable media may include, but is not limited to, volatile media, non-volatile media, removable media, and non-removable media implemented in any method or technology for storage of information such as computer-readable instructions, data structures, program modules, or other data. System memory 504, removable storage 508, and non-removable storage 510 are all examples of tangible computer storage media. Examples of tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 506 may execute program code stored in the system memory 504. For example, the bus may carry data to the system memory 504, from which the processing unit 506 receives and executes instructions. The data received by the system memory 504 may optionally be stored on the removable storage 508 or the non-removable storage 510 before or after execution by the processing unit 506.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and it may be combined with hardware implementations.

While the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered limited only by the spirit and scope of the disclosure (and claims), including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive.

It should be appreciated that various sizes, dimensions, contours, rigidity, shapes, flexibility, and materials of any of the components or portions of components in the various embodiments discussed throughout may be varied and utilized as desired or required.

It should be appreciated that while some dimensions are provided on the aforementioned figures, the device may constitute various sizes, dimensions, contours, rigidity, shapes, flexibility, and materials as it pertains to the components or portions of components of the device, and therefore may be varied and utilized as desired or required.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the disclosure, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particular interrelationship of such elements. Accordingly, the descriptions and drawings are to be regarded as illustrative in nature and not as restrictive. Moreover, when any number or range is described herein, unless clearly stated otherwise, that number or range is approximate. When any range is described herein, unless clearly stated otherwise, that range includes all values therein and all sub-ranges therein. Any information in any material (e.g., a United States/foreign patent, United States/foreign patent application, book, article, etc.) that has been incorporated by reference herein is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the disclosed technology. Similarly, it is also to be understood that the mention of one or more components in a device or system does not preclude the presence of additional components or intervening components between those components expressly identified.

What is claimed is:

1. A modular panoramic display system comprising:
    at least one edgeless computing device comprising a first plurality of side panels, wherein at least one side panel comprises one or more first recessed or extruding connecting elements; and
    a plurality of edgeless display devices operatively coupled to the at least one edgeless computing device via a plurality of panoramic edge connection devices that each comprise a separate housing, wherein:
        each of the plurality of edgeless display devices comprises a second plurality of side panels having one or more second recessed or extruding connecting elements, and
        each of the plurality of panoramic edge connection devices comprises an elongated member with a curved rear surface and at least one of a recessed edge panel or an extruding edge panel proximate the curved rear surface that is configured to mate with one of the first recessed or extruding connecting elements on a respective surface of the at least one edgeless computing device or one of the second recessed or extruding connecting elements on a respective surface of at least one of the plurality of edgeless display devices.

2. The modular panoramic display system of claim 1, wherein a first edgeless computing device and the plurality of edgeless display devices are operatively coupled to one another vertically such that a bottom surface of the first edgeless computing device is adjacent a top surface of a first edgeless display device, and a top surface of the first edgeless computing device is adjacent a bottom surface of a second edgeless display device.

3. The modular panoramic display system of claim 1, wherein a first edgeless computing device and the plurality of edgeless display devices are configured to be operatively coupled to one another horizontally such that a first side surface of the first edgeless computing device is adjacent a first side surface of a first edgeless display device, and a second side surface of the first edgeless computing device is adjacent a first side surface of a second edgeless display device.

4. The modular panoramic display system of claim 1, wherein the at least one edgeless computing device and the plurality of edgeless display devices are operatively coupled to one another to form a continuous octagonal array.

5. The modular panoramic display system of claim 1, wherein the at least one edgeless computing device comprises between one and three edgeless computing devices, and wherein the plurality of edgeless display devices comprises between six to eight edgeless display devices.

6. The modular panoramic display system of claim 1, wherein each of the first plurality of side panels and each of the second plurality of side panels comprises at least one of a Universal Serial Bus port, Lighting port, High-Definition Multimedia Interface (HDMI) port, Ethernet port, charging port, a Micro Secure Digital (SD) port, audio/microphone port, Thunderbolt port, or Wireless Fidelity (Wi-Fi) switch.

7. The modular panoramic display system of claim 1, wherein the at least one edgeless computing device comprises a first side panel with recessed connecting elements and a second side panel with recessed connecting elements.

8. The modular panoramic display system of claim 1, wherein the at least one edgeless computing device further comprises:
    at least one processor; and
    at least one memory including computer program code for one or more programs, and a network interface, the at least one memory and the computer program code configured to, with the at least one processor, cause the at least one edgeless computing device to:
        cause and/or control display of information/data to the plurality of edgeless display devices.

9. The modular panoramic display system of claim 1, wherein each of the plurality of panoramic edge connection devices is configured to obtain power from the at least one edgeless computing device or one of the plurality of edgeless display devices.

* * * * *